(12) United States Patent
Inagawa

(10) Patent No.: US 6,452,697 B2
(45) Date of Patent: Sep. 17, 2002

(54) FACSIMILE APPARATUS, LINE CONTROL BOARD AND COMMUNICATION CONTROL METHOD

(75) Inventor: Eiji Inagawa, Ueda (JP)

(73) Assignee: Matsushita Graphic Communication Systems, Inc., Tokyo (JP)

( * ) Notice: Subject to any disclaimer, the term of this patent is extended or adjusted under 35 U.S.C. 154(b) by 0 days.

(21) Appl. No.: 09/154,471

(22) Filed: Sep. 16, 1998

(30) Foreign Application Priority Data

Sep. 24, 1997 (JP) .............................................. 9-276422

(51) Int. Cl.$^7$ ................................................ H04N 1/00
(52) U.S. Cl. ....................... 358/440; 358/436; 358/437; 358/400; 358/407; 379/100.01; 379/100.02
(58) Field of Search ................................ 358/440, 436, 358/437, 434, 468, 400, 442, 407; 379/100.01, 100.02, 100.03, 100.04, 100.05, 100.12, 100.1, 100.09; 432/352

(56) References Cited

U.S. PATENT DOCUMENTS

| | | | | |
|---|---|---|---|---|
| 4,910,765 A | * | 3/1990 | Matsuse et al. | 379/100 |
| 4,964,154 A | * | 10/1990 | Shimotono | 379/100 |
| 4,991,200 A | * | 2/1991 | Lin | 379/100 |
| 5,751,442 A | * | 5/1998 | Hamada et al. | 358/442 |
| 5,801,839 A | * | 9/1998 | Ochiai | 358/404 |
| 5,892,815 A | * | 4/1999 | Yoshida et al. | 379/100.16 |
| 5,991,053 A | * | 11/1999 | Matsuo et al. | 358/468 |
| 6,005,671 A | * | 12/1999 | Ishikawa | 358/407 |
| 6,005,924 A | * | 12/1999 | Krexner et al. | 379/100.16 |
| 6,008,908 A | * | 12/1999 | Matsumoto et al. | 358/442 |
| 6,021,186 A | * | 2/2000 | Suzuki et al. | 379/100.12 |
| 6,023,346 A | * | 2/2000 | Hiroyuki | 358/434 |
| 6,031,635 A | * | 2/2000 | Momonami | 358/434 |
| 6,035,022 A | * | 3/2000 | Kim | 379/100.01 |
| 6,049,597 A | * | 4/2000 | Satake et al. | 379/93.08 |
| 6,055,069 A | * | 4/2000 | Cho | 358/468 |
| 6,097,505 A | * | 8/2000 | Miwa et al. | 358/434 |
| 6,122,066 A | * | 9/2000 | Hobo | 358/1.15 |
| 6,144,459 A | * | 11/2000 | Satou | 358/1.15 |
| 6,198,815 B1 | * | 3/2001 | Mishima | 379/355 |

FOREIGN PATENT DOCUMENTS

| | | | | |
|---|---|---|---|---|
| EP | 750416 | * | 12/1996 | H04N/1/32 |
| EP | 0798916 | * | 2/1997 | H04N/1/327 |
| EP | 798916 A2 | * | 10/1997 | H04N/1/327 |
| EP | 798916 | | 10/1997 | |
| EP | 0750416 | * | 12/1999 | H04N/1/32 |
| JP | 7-56828 | * | 3/1995 | H04N/1/32 |

* cited by examiner

*Primary Examiner*—Edward Coles
*Assistant Examiner*—Tia Carter
(74) *Attorney, Agent, or Firm*—Greenblum & Bernstein, P.L.C.

(57) ABSTRACT

In the case that a PC sends a call to a called site on a telephone line network, but fails in its connection, the PC and a modem of a facsimile apparatus are connected. Then, the telephone number and image data of the called site are stored in a RAM of the facsimile apparatus. After storage is completed, the telephone line network and the modem of the facsimile apparatus are connected. Then, a call is sent to the called site and the image data is sent to the called site. This allows connection to be made to the PC without using a dedicated interface and prevents burdening on the PC in redialing in the case that there is no answer from the called site.

8 Claims, 5 Drawing Sheets

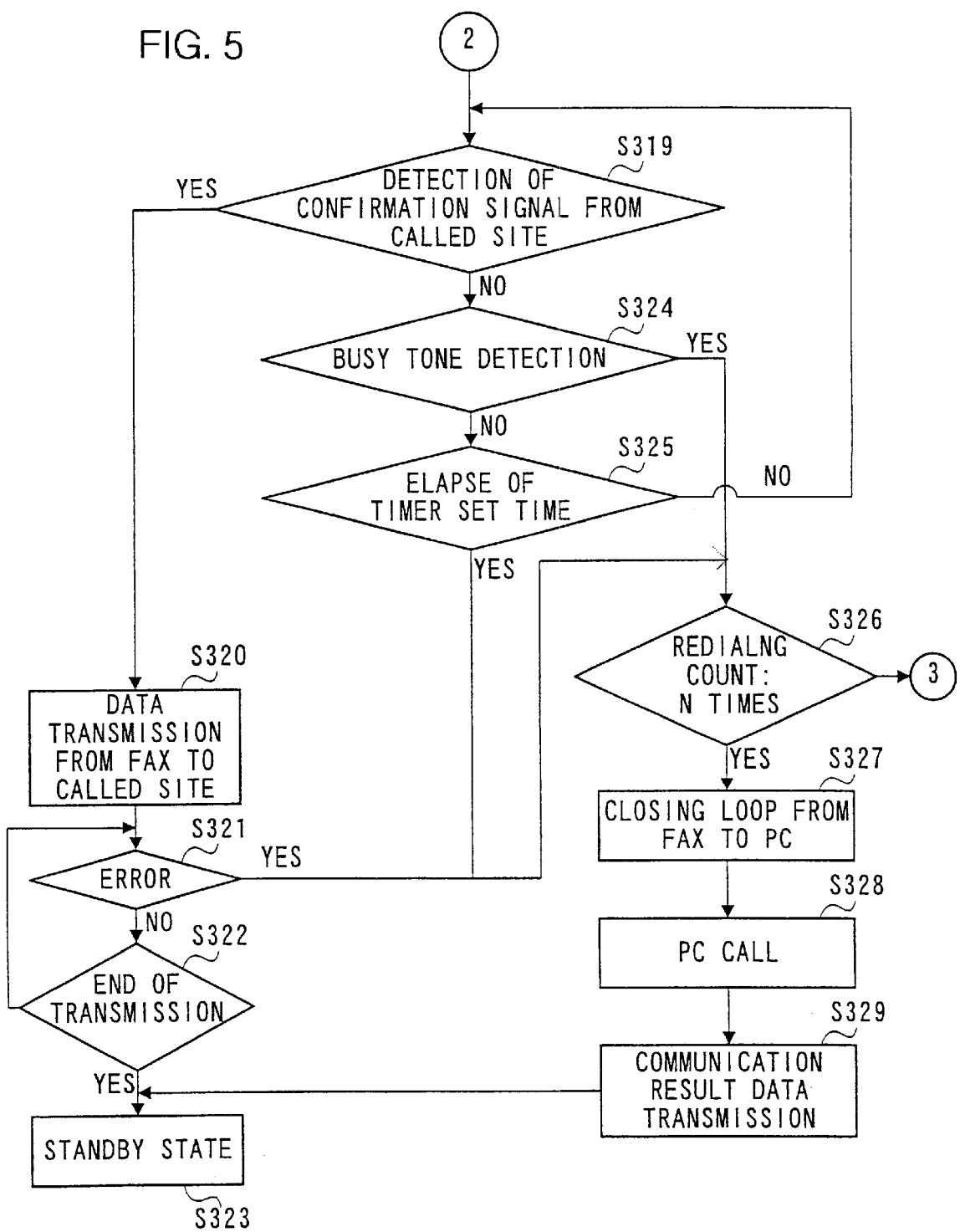

FACSIMILE APPARATUS, LINE CONTROL BOARD AND COMMUNICATION CONTROL METHOD

BACKGROUND OF THE INVENTION

1. Field of the Invention

The present invention relates to facsimile apparatuses connected to a computer which transmit documents created by the computer to other facsimile apparatuses via a telephone line.

2. Description of the Related Art

Recently, development of networks has made it a common practice to connect other devices, especially personal computer (hereafter referred to as "PC") to facsimile apparatuses connected to a telephone line to communicate information such as sending documents created by a PC to other facsimile apparatuses.

Conventionally, two methods are available for connection between a facsimile apparatus and PC, simply connecting an external telephone terminal of a line control board of the facsimile apparatus and a modem with a facsimile function via line cord (hereafter referred to as "1st method") and using a dedicated interface such as RS232C (hereafter referred to as "2nd method").

However, according to the 1st method, when another facsimile apparatus which is a called site does not respond to a call from the PC, the PC must also send 2nd and subsequent calls, which increase a load of the PC.

On the other hand, according to the 2nd method, when there is no answer from the called site, it is possible for the facsimile apparatus to carry out a redial or notify the PC of communication results. However, this method requires the facsimile apparatus to have a dedicated interface circuit, increasing the scale of circuit. It also requires driver software to be installed in the PC.

SUMMARY OF THE INVENTION

It is an objective of the present invention to provide a facsimile apparatus which will allow connection with a computer without using a dedicated interface and can reduce the load of the computer in redialing when there is no answer from the called site.

Another objective of the present invention is to provide a line control board for the facsimile apparatus which is connected to a computer without using a dedicated interface through control of the facsimile apparatus and can reduce the load of the computer in redialing when there is no answer from the called site.

A further objective of the present invention is to provide a communication control method in the facsimile apparatus which is connected to a computer without using a dedicated interface and can reduce the load of the computer in redialing when there is no answer from the called site.

The present invention provides a facsimile apparatus, comprising:

first interface means for connecting a first telephone line which is connected to an external terminal;

second interface means for connecting a second telephone line which is connected with a called site;

first transmission control means for transmitting transmit data from said external terminal to said second telephone line at detecting a call from said external terminal and then connecting said first interface means and said second interface means;

storage means for storing information of the called site and said transmit data received from said external terminal; and second transmit control means for monitoring said second telephone line and disconnecting said first interface means and said second interface means when said called site is not in condition to receive said transmit data and then transmitting said stored transmit data by redialing said called site based on said stored information of the called site.

The present invention provides a line control board, comprising:

first interface means for connecting a first telephone line which is connected to an external terminal;

second interface means for connecting a second telephone line which is connected to a called site;

first switching means for switching the connection destination of said first telephone line;

second switching means for switching the connection destination of said second telephone line third interface means for connecting a facsimile apparatus and receiving an instruction from the facsimile apparatus;

wherein said first switching means and said second switching means change the destinations of the first telephone line and the second telephone line according to said instruction.

The present invention provides a communication control method for a facsimile apparatus, comprising the steps of:

detecting a call from an external terminal connected to the facsimile apparatus via a first telephone line and sending transmit data from said external terminal to a second telephone line connected to said facsimile apparatus;

storing the information of the called site and said transmit data received from said external terminal;

monitoring said second telephone line and redialing said called site based on said stored information of the called site to transmit said stored transmit data when said called site is not in condition to receive said transmit data.

The present invention provides a facsimile apparatus by way of which transmit data is sent from an external terminal to a called site, comprising:

first interface that is connected to a first telephone line connected by said external terminal;

second interface that is connected to a second telephone line connected by said called site;

modem for transmitting/receiving data via said first telephone line or said second telephone line;

call detector that detects a call signal input from said external terminal via said first interface;

connection confirmation signal detector that detects a connection confirmation signal input from said called site via said second interface;

busy signal detector that detects a busy signal input via said second interface;

memory that stores said transmit data input via said first interface;

switch that switches between a first path that connects said first Interface and said modem, a second path that connects said first interface and said second interface and a third path that connects said modem and said second interface;

central processing unit that controls switching between said first path, second path and third path by said switch and transmission/reception of said data by said modem;

wherein:
said central processing unit, in response to a detection signal from said call detector, makes said switch change from said first path to said second path to send said call signal to said called site, then, in response to a detection signal from said connection confirmation signal detector, send said transmit data from said external terminal to said called site, while it makes said switch change from said second path to said third path according to a detection signal from said busy signal detector and makes said modem transmit said transmit data stored in said memory to said called site.

BRIEF DESCRIPTION OF THE DRAWINGS

FIG. 3 to FIG. 5 illustrate flow charts showing the flow of operations of the facsimile apparatus in the present embodiment.

DETAILED DESCRIPTION OF THE PREFERRED EMBODIMENTS

Figure 1:
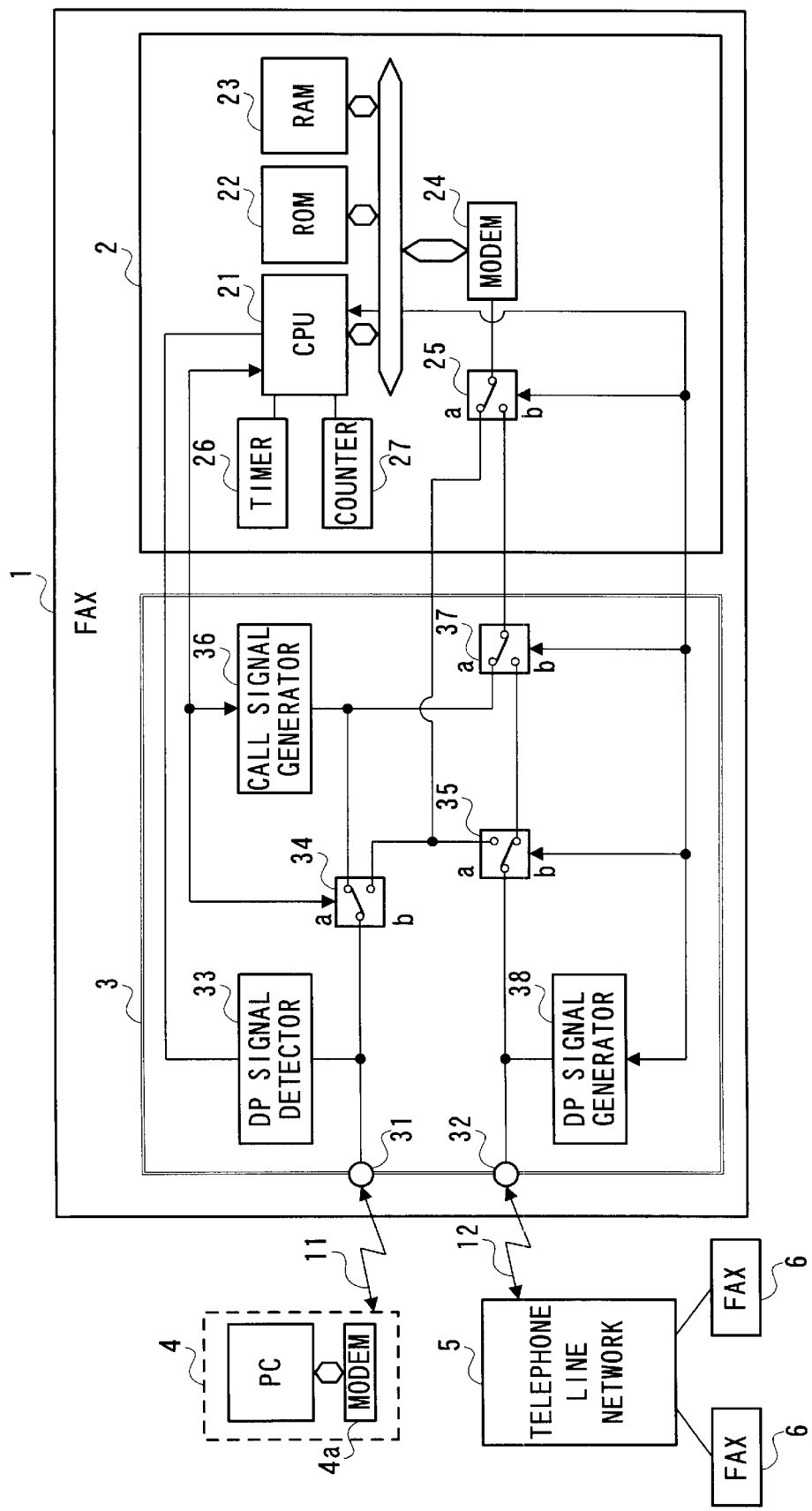
FIG.1 illustrates a block diagram showing an outline of the configuration of a facsimile apparatus in an embodiment of the present invention.

With reference now to the attached drawings, the embodiments of the present invention are explained below:

FIG. 1 illustrates a block diagram showing an outline of the configuration of a facsimile apparatus in a first embodiment of the present invention.

As shown in FIG. 1, facsimile apparatus 1 according to the present embodiment mainly comprises facsimile apparatus 2 that scans original documents and outputs image data, etc. and circuit control board 3 that relays with external devices.

Facsimile apparatus 2 mainly comprises CPU 21 that controls units of the facsimile apparatus 2, ROM 22 that is a read-only storage apparatus, RAM 23 that is used as the data processing work area, an internal modem 24 that modulates and demodulates communication data, switch 25 that switches the input destination of a signal input to the internal modem 24 and the output destination of a signal output from the internal modem 24, timer 26 that counts number of times by a prescribed number, and counter 27 that counts number of times by a prescribed number.

A circuit control board 3 mainly comprises an external telephone connection terminal 31 that is connected to PC 4 which is provided with an external modem 4a with a facsimile function, a line connection terminal 32 that is connected to telephone line network 5, a DP signal detection circuit 33 that detects a DP (Dial Pulse) signal called by the PC 4, a switch 34 that switches the connection destination of the external telephone connection terminal 31, a switch 35 that switches the connection destination of the line connection terminal 32, a call signal generator 36 that generates a call signal to call the PC 4, a switch 37 that switches the input destination of a signal input to the internal modem 24 and the output destination of a signal output from the internal modem 24, and a DP signal generator 38 that generates a DP signal.

Herein, the PC 4 is connected to the external modem 4a. The external modem 4a is connected to the external telephone connection terminal 31 via first telephone line 11. The telephone line network 5 is connected to the line connection terminal 32 via second telephone line 12. The telephone line network 5 includes PSTN and PBX. The telephone line network 5 includes facsimile apparatuses 6 as a called site and an exchange that is not shown in the figure.

In FIG. 1, in a normal standby state, the switches 34, 35, 37 and 25 select their respective terminal "a". In this way, the internal modem 24 of the facsimile apparatus 2 connects with the telephone line network 5 via line connection terminal 32, the switch 35 and the switch 25.

When carrying out communications between the facsimile apparatus 2 and the PC 4, and the switches 34, 35 and select their respective terminal "a" and switch 25 selects terminal "b". In this way, the internal modem 24 of the facsimile apparatus 2 connects with the PC 4 via the external telephone connection terminal 31, and the switches 34, 37 and 25.

When carrying out communications between the facsimile apparatus 2 and the telephone line network 5, the switch 34 selects terminal "a"; the switch 35 selects terminal "b"; the switch 37 selects terminal "b"; and the switch 25 selects terminal "b". In this way, the internal modem 24 connects with the telephone line network 5 via the line connection terminal 32, and the switches 35, 37 and 25.

When carrying out communications between the PC 4 and the telephone line network 5, the switch 34 selects terminal "b"; the switch 35 selects terminal "a"; the switch 37 selects terminal "a"; and the switch 25 selects terminal "a". In this way, the PC4 connects with the telephone line network 5 via the external telephone connection terminal 31, the switches 34, 35 and the line connection terminal 32.

Then, an outline of the function of the CPU 21 in the present embodiment is explained with reference to the functional block diagram in FIG. 2.

Figure 2:
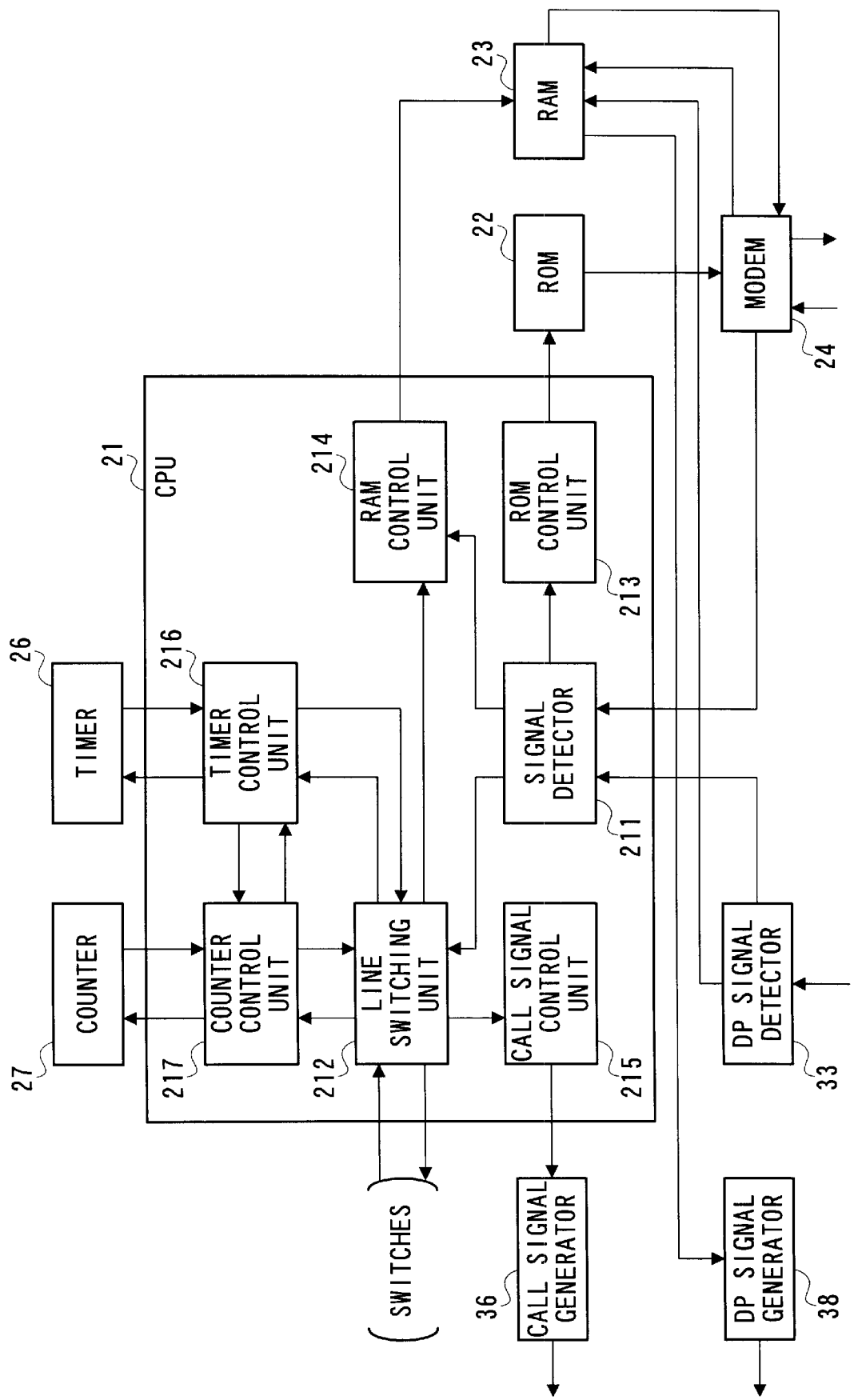
FIG. 2 illustrates a functional block diagram showing an outline of the CPU function of the facsimile apparatus in the present embodiment.

As shown in FIG. 2, the CPU 21 operates based on a series of programs comprising a signal detector 211 that detects various signals, switch unit 212 that changes switches and checks the switching operations, ROM control unit 213 that controls data transmission of ROM 22, RAM control unit 214 that controls data transmission/reception of RAM 23, call signal control unit 215 that controls the call signal generator, timer control unit 216 that controls start/reset, etc. of timer 26, and counter control unit 217 that controls start/reset, etc. of counter 27.

Figure 3:
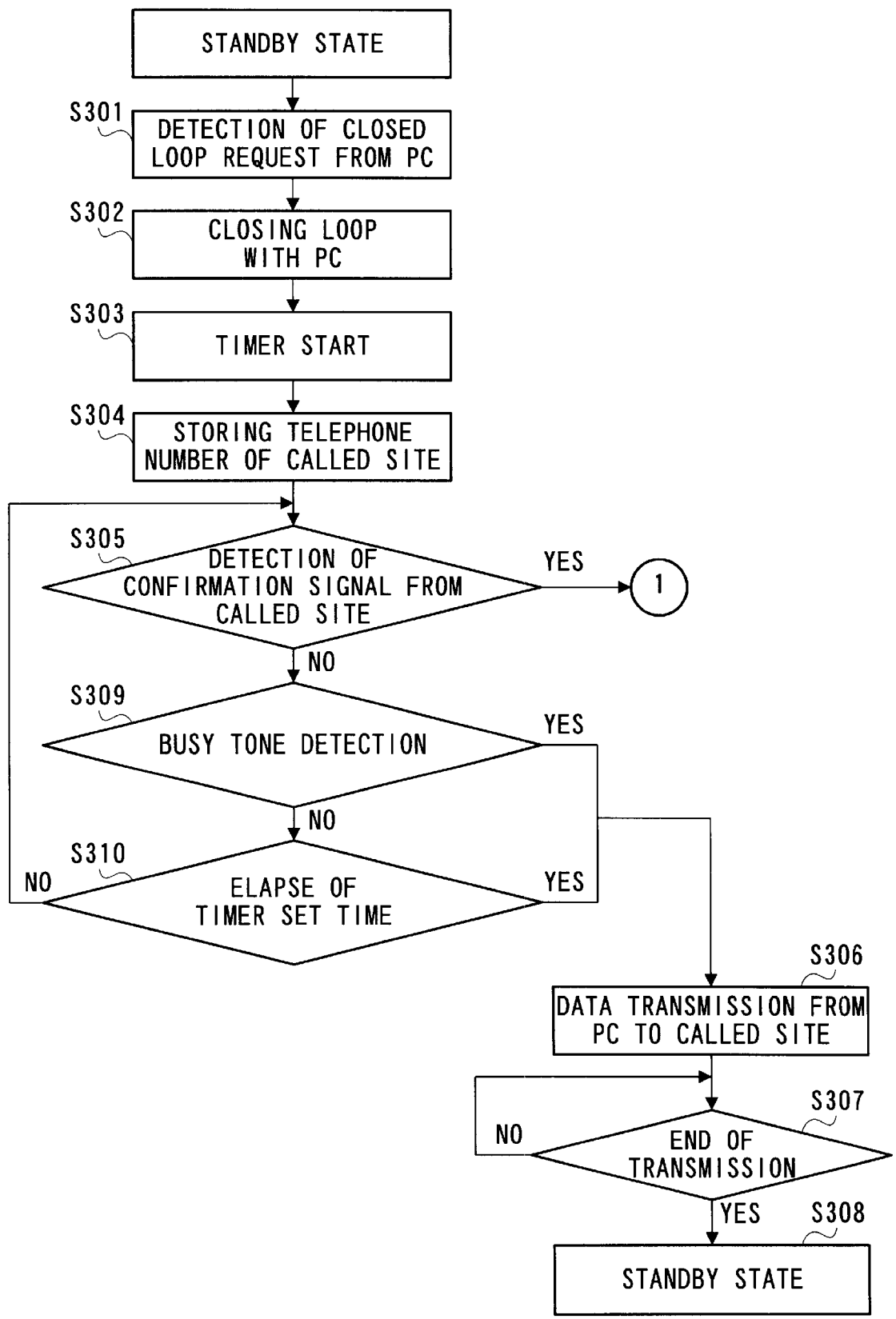
Figure 4:
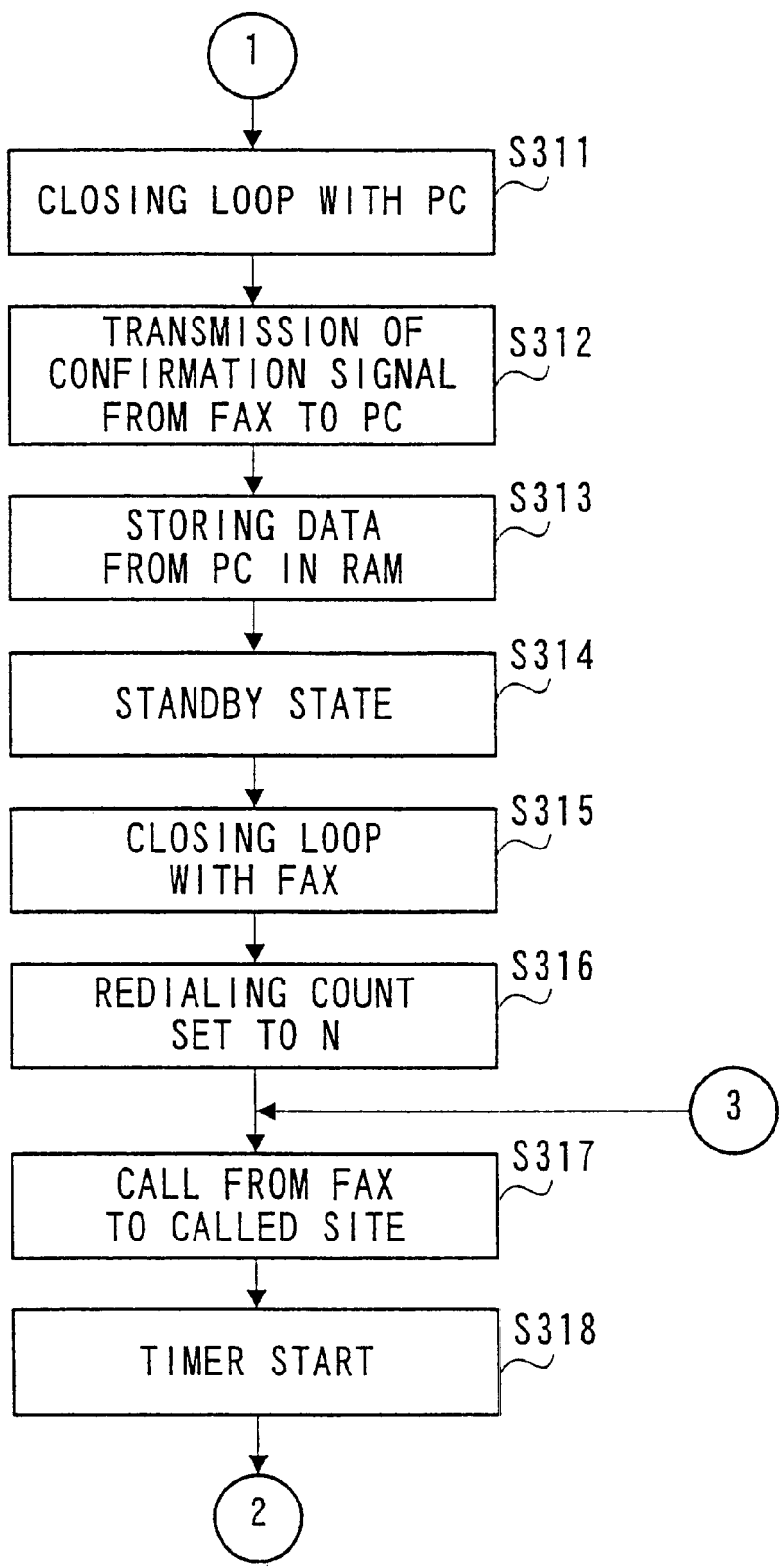

Then, the flow of operations of the facsimile apparatus in the present embodiment is explained with reference to FIGS. 3 to 5. FIGS. 3 to 5 are flow charts showing the flow of operations of the facsimile apparatus in the present embodiment.

In a standby state, when the PC 4 requests for closing the loop of the DC circuit in order to call the called site which is another facsimile apparatus, a DC circuit closed loop request current is detected by the signal detector 211 via the DP signal detection circuit 33 (S301).

Then, when the DC circuit closed loop request current from the PC 4 is detected by signal detector 211, the line switching unit 212 switches the mobile terminal of switch 34 from "a" to "b" and the PC 4 and the telephone line network 5 are connected (S302). Then when the switching of switch 34 is confirmed by the line switching unit 212, the timer control unit 216 starts the timer 26 (S303).

Then, the PC 4 calls the telephone number of the called site and the called telephone number is stored in the RAM 23 via DP detection circuit 33 in the case of a DP signal and via the internal modem 24 in the case of a PB (Push Button) signal (S304).

Here, when a confirmation signal (hereafter referred to as "CED") from the called site is detected by the signal detector 211 and the PC 4 (S305), transmission of image data from the PC 4 to the called site is started (S306). When the transmission of the image data is completed and the PC 4 opens the DC circuit (S307). This opening the DC circuit is detected by the signal detector 211, and the line switching unit 212 switches the mobile terminal of switch 34 from "b" to "a" and returns to the standby state (S308).

After a call signal is sent from the PC 4 to the called site, when a busy tone from the exchange is detected by the signal detector 211 (S309), or after the timer 26 is started, when no CED is detected by the signal detector 211 or the PC 4 after the elapse of a prescribed time (S310), the line switching unit 212 switches the mobile terminal of switch 34 from "b" to "a" and the mobile terminal of the switch 25 from "a" to "b", closing the loop from the PC 4 to the facsimile apparatus 2 (S311).

When the line switching unit 212 confirms the switching of the switch 34, a CED is sent from the internal modem 24 to the PC 4 (S312). Then, image data is sent from PC 4, demodulated by the internal modem 24 and stored in the RAM 23 (S313).

When there is no answer from the called site, sending the image data from the PC to the facsimile apparatus can eliminate the redialing load on the computer.

When storage of the image data is completed, the line switching unit 212 switches the mobile terminal from "b" to "a" and returns to the standby state (S314). Here, when it is necessary to carry out other processing such as data reception from another facsimile apparatus, the other processing is completed first.

After the standby state, the line switching unit 212 switches the mobile terminal of switch 35 from "a" to "b" and the mobile terminal of switch 37 from "a" to "b" and the mobile terminal of switch 25 from "a" to "b", and the loop from the telephone line network 5 to the facsimile apparatus 2 is closed (S315).

Then, the counter control unit 217 sets redial count N in the counter 27 (S316) and the telephone number of the called site stored in the RAM 23 is called by the DP signal generator 38 in the case of a DP signal and internal modem 24 in the case of a PB signal (S317), and at the same time the timer control unit 216 starts the timer 26 (S318).

Then, when the signal detector 211 detects the CED from the called site (S319), the image data stored in the RAM 23 is sent to the called site (S320). And when transmission of the image data is completed without communication error in the middle of transmission (S321), a transmission completion signal is detected by the signal detector 211 and the line switching unit 212 switches the mobile terminal of the switch 35 from "b" to "a", the mobile terminal of switch 37 from "b" to "a" and the mobile terminal of switch 25 from "b" to "a" and returns to the standby state (S323).

After a call signal is sent from the facsimile apparatus 2 to the called site, when the signal detector 211 detects a busy tone of the exchange (S324) or when no CED is detected by the signal detector 211 and the PC 4 when a prescribed time has elapsed after the timer 26 was started (S325), the operation from S317 to S325 is repeated N times at fixed intervals (S326). When the transmission to the called site is not completed in the meantime, the line switching unit 212 switches the mobile terminal of the switch 37 from "b" to "a", closing the loop from the PC 4 to the facsimile apparatus 2 (S327).

If the line switching unit 212 confirms the switching of the switch 37, the call signal control unit 215 sends a call signal from the call signal generator 36 to the PC 4 (S328).

After the CED from the PC 4 is detected by the signal detector 211, the communication result data is sent from the ROM 22 to the PC 4 (S329), the line switching unit 212 switches the mobile terminal of the switch 25 from "b" to "a" and returns to the standby state (S323).

Transmitting the communication result data to the PC 4 allows the PC 4 operator to know the communication result without any operation.

As described above, according to the facsimile apparatus 1 in the present embodiment, the PC 4 is connected without using a dedicated interface and PC 4 decrease load of the redialing in case that there is no answer from the another facsimile apparatus 6 which is the called site. Furthermore, even if the PC 4 has no automatic redialing function, the PC 4 operator can handle a case where the facsimile apparatus 6 cannot receive data without any operation at the time of redialing.

When transmit data cannot be sent to the facsimile apparatus 6, the facsimile apparatus 1 sends the communication result data to the PC 4 allowing the PC 4 operator to know without carrying out any operation that the transmission has ended abnormally.

The present invention is not limited to the embodiments described above. For example, the case where a PC is connected to a facsimile apparatus is presented here. However, it is not limited to a PC but it is possible to connect an external terminal such as portable information terminal, word processor to the facsimile apparatus in the present invention via an internal modem or an external modem.

What is claimed is:

1. A facsimile apparatus, comprising:
a first interface section that connects to an external terminal;
a second interface section that connects to a destination via a telephone line network;
a first transmission control section that connects said first interface section and said second interface section to transmit data from the external terminal to the destination when a call signal from the external terminal is detected;
a storage section that stores destination information and data to be transmitted from the external terminal when the destination is not in condition to receive the data during operation of said first transmission; and
a second transmission control section that redials the destination based on the stored destination information, to transmit the data in said storage section after disconnecting said first interface section and the external terminal from the facsimile apparatus when the destination is not in condition to receive the data,
wherein the external terminal is a personal computer.

2. A facsimile apparatus, comprising:
a first interface section that connects to an external terminal;
a second interface section that connects to a destination via a telephone line network;
a first transmission control section that connects said first interface section and said second interface section to transmit data from the external terminal to the destination when a call signal from the external terminal is detected;
a storage section that stores destination information and data to be transmitted from the external terminal when the destination is not in condition to receive the data during operation of said first transmission;

a detection section that determines that the destination is not in condition to receive the data, based on detection of a busy tone; and a second transmission control section that redials the destination based on the stored destination information to transmit the data in said storage section after disconnecting said first interface section and the external terminal from the facsimile apparatus when the destination is detected to not be in a condition to receive the data.

3. A facsimile apparatus, comprising:

a first interface section that connects to an external terminal;

a second interface section that connects to a destination via a telephone line network;

a first transmission control section that connects said first interface section and said second interface section to transmit data from the external terminal to the destination when a call signal from the external terminal is detected;

a storage section that stores destination information and data to be transmitted from the external terminal when the destination is not in condition to receive the data during operation of said first transmission;

a detection section that determines that the destination is not in condition to receive the data when a confirmation signal is not detected after elapse of a prescribed time; and a second transmission control section that redials the destination based on the stored destination information to transmit the data in said storage section after disconnecting said first interface section and the external terminal from the facsimile apparatus when the destination is detected to not be in a condition to receive the data.

4. A facsimile apparatus, comprising:

a first interface section that connects to an external terminal;

a second interface section that connects to a destination via a telephone line network;

a first transmission control section that connects said first interface section and said second interface section to transmit data from the external terminal to the destination when a call signal from the external terminal is detected;

a storage section that stores destination information and data to be transmitted from the external terminal when the destination is not in condition to receive the data during operation of said first transmission;

a second transmission control section that redials the destination based on the stored destination information to transmit the data in said storage section after disconnecting said first interface section and the external terminal from the facsimile apparatus when the destination is not in a condition to receive the data; and a storage section that stores communication result data, wherein, when the data cannot be transmitted to the destination, the communication result data is transmitted to the external terminal.

5. A communication control method for a facsimile apparatus, the facsimile apparatus having a first interface section that connects to a personal computer, and a second interface section that connects to a destination via a telephone line network, the method comprising:

connecting the first interface section and the second interface section when data is transmitted from the personal computer to the destination;

storing destination information and the data from the personal computer when the destination is not in condition to receive the data during the connecting of the first interface section and the second interface section;

redialing the destination based on the stored destination information to transmit the stored data after disconnecting the first interface section and the personal computer from the facsimile apparatus when the destination is not in a condition to receive the data upon connecting of the first interface section and the second interface section.

6. A communication control method for a facsimile apparatus, the facsimile apparatus having a first interface section that connects to an external terminal, and a second interface section that connects to a destination via a telephone line network, the method comprising:

connecting the first interface section and the second interface section when data is transmitted from the external terminal to the destination;

detecting a busy tone which indicates that the destination is not in condition to receive data from the external terminal;

storing destination information and the data from the external terminal when the destination is not in condition to receive the data during the connecting of the first interface section and the second interface section;

redialing the destination, based on the stored destination information, to transmit the stored data, after disconnecting the first interface section and the external terminal from the facsimile apparatus, when the destination is not in condition to receive the data from the external terminal upon connecting of the first interface section and the second interface section.

7. A communication control method for a facsimile apparatus, the facsimile apparatus having a first interface section that connects to an external terminal, and a second interface section that connects to a destination via a telephone line network, the method comprising:

connecting the first interface section and the second interface section when data is transmitted from the external terminal to the destination;

detecting the elapse of a predetermined time without reception of a confirmation signal, which indicates that the destination is not in condition to receive the data from the external terminal;

storing destination information and the data from the external terminal when the destination is not in condition to receive the data during the connecting of the first interface section and the second interface section;

redialing the destination, based on the stored destination information, to transmit the stored data after disconnecting the first interface section and the external terminal from the facsimile apparatus, when the destination is not in condition to receive the data from the external terminal upon connecting of the first interface section and the second interface section.

8. A communication control method for a facsimile apparatus, the facsimile apparatus having a first interface section that connects to an external terminal, and a second interface section that connects to a destination via a telephone line network, the method comprising:

connecting the first interface section and the second interface section when data is transmitted from the external terminal to the destination;

storing information including destination information and the data from the external terminal when the destination is not in condition to receive the data during the connecting of the first interface section and the second interface section;

redialing the destination based on the stored destination information to transmit the stored data after disconnecting the first interface section and the external terminal from the facsimile apparatus when the data from the external terminal is not transmitted by the connecting of the first interface section and the second interface section; and storing information further comprises storing communication result data and when the data cannot be transmitted from the external terminal to the destination, the communication result data is transmitted to the external terminal.

* * * * *

UNITED STATES PATENT AND TRADEMARK OFFICE
CERTIFICATE OF CORRECTION

PATENT NO.     : 6,452,697 B2
DATED          : September 17, 2002
INVENTOR(S)    : E. Inagawa It is certified that error appears in the above-identified patent and that said Letters Patent is hereby corrected as shown below:

<u>Title page,</u>
Item [56], References Cited, U.S. PATENT DOCUMENTS, the following references were omitted and should be included:

```
--    5,499,109    3/1996    Marthur et al.   358/400
      5,923,442    7/1999    Miyaoka          358/442 --
```

Signed and Sealed this

Twenty-ninth Day of April, 2003

JAMES E. ROGAN
*Director of the United States Patent and Trademark Office*